United States Patent [19]

Choquard et al.

[11] Patent Number: 6,077,212

[45] Date of Patent: Jun. 20, 2000

[54] PROCESS FOR THE CONFINEMENT OF SOLID MATERIALS

[75] Inventors: Philippe Choquard, Cologny, Switzerland; Roger JP Lamartine, Villeurbanne, France

[73] Assignee: Fillger S.A., Switzerland

[21] Appl. No.: 09/065,093

[22] PCT Filed: Oct. 17, 1996

[86] PCT No.: PCT/IB96/01101

§ 371 Date: Apr. 24, 1998

§ 102(e) Date: Apr. 24, 1998

[87] PCT Pub. No.: WO97/15626

PCT Pub. Date: May 1, 1997

[30] Foreign Application Priority Data

Oct. 24, 1995 [CH] Switzerland ............................ 3005/95

[51] Int. Cl.[7] ........................................ G21F 9/34

[52] U.S. Cl. ........................................ 588/255; 588/259

[58] Field of Search .................................... 588/255, 259, 588/256, 257, 6

[56] References Cited

U.S. PATENT DOCUMENTS 4,432,666 2/1984 Frey et al. .............................. 405/129
4,715,992 12/1987 Snyder et al. .......................... 252/628
4,764,305 8/1988 De Tassigny .......................... 252/628

FOREIGN PATENT DOCUMENTS 2098197 3/1972 France .
2376165 7/1978 France .
3603080 8/1987 Germany .

*Primary Examiner*—David Bagnell
*Assistant Examiner*—Zakiya Walker
*Attorney, Agent, or Firm*—Ostrolenk, Faber, Gerb & Soffen, LLP

[57] ABSTRACT

A process for the confinement of generally harmful solid materials is disclosed and claimed. The solid materials are immobilized and confined within a solid matrix for an unlimited storage free from pollution risks. The solid materials are mixed with at least one low condensed, liquid phenolic resin and a cross-linking agent which is selected from partly or wholly sulfonated linear and/or cyclic phenolic oligomers, and the cross-linking which forms said solid matrix under hardening is allowed to occur. When a mould is used for the hardening reaction, solid blocks are formed which are resistant to water, heat, and environmental acids and bases. These blocks need not be stored in a safe environment but can further be used for applications such as construction elements.

19 Claims, No Drawings

PROCESS FOR THE CONFINEMENT OF SOLID MATERIALS

BACKGROUND OF THE INVENTION

1. Field of the Invention

This invention belongs to the technical field of confinement or inert storage of polluting and toxic materials. The invention particularly refers to a process for the ultimate confinement of solid materials which may be in powder form or not, such as ultimate wastes, in order to avoid any danger for the environment. Further, the invention is related to shaped bodies as obtained by the process of the invention.

Numerous are the wastes and residues of our civilisation which can no longer simply be disposed of in pouring them on waste dumping grounds since their lixiviation by rain water and snow will contaminate the soil and the groundwater. Heavy metals such as zinc, copper, mercury, cadmium, nickel, lead and so on which can be found in numerous waste solids, especially in residual ashes of waste and garbage incineration plants, constitute a major risk. These metals, generally in the form of oxides, are enriched in the ashes and are particularly sensitive to lixiviation.

It is therefore nowadays necessary to stabilize these wastes by confinement with materials that must remain stable.

2. Description of the Prior Art

Until now, a method which is well established and currently used at a great scale is the stabilization of solid wastes, preferably ultimate wastes which cannot further be reduced in volume and in weight, by concrete confinement. The wastes are in principle blended with a concrete containing hydraulic binder, blocks are manufactured from the mixture to which water was added, the blocks are left for hardening, and the hardened blocks are finally stored at a safe place on a dumping ground under supervision.

However, it is of course not possible to store all these blocks thus manufactured in caverns where they are protected against meteorological precipitations, especially rain water. Concrete blocks are not inert against leaching or lixiviation brought about by these precipitations; the hardened concrete being a basic medium, it is attacked by water that contains acid substances such as atmospheric carbon dioxide and sometimes sulfurous, sulfuric, nitrous and nitric acids.

It has already been necessary to establish standards defining maximum metal concentrations in the lixiviated liquors which occur in an open air dumping ground. Furthermore, the maximum concentration of certain components, before all heavy metals, of the wastes to be confined in concrete blocks had to be limited. It follows that part or the wastes, namely those which contain more heavy metals than allowed, can no longer be confined normally but must be diluted in a certain manner before being contained and stabilized in the concrete.

Therefore, other possibilities for the confining treatment of wastes have been searched, and the stabilization of the residues by heat setting materials has been considered, see Environnement et Technique 127, 45 (June 1993). Depending on the physical state of solid, liquid or gas of the ultimate wastes to be stabilized, the confinement methods comprise coating, encapsulating and captivating techniques. The final objective of such methods is to contain and to isolate all these materials in a form that is permanently stable and that does not release toxic or dangerous substances.

For example, German Patent Application No. DE-A1-3,603,080 discloses a method for the manufacture of waste material blocks wherein shaped, artificial stone like bodies are first made from binders such as concrete, water and aggregates, and the wastes are then transferred into hollow boxes made from the shaped bodies. As a variant, the wastes are blended into the mixture of concrete, aggregate and water. Of course, this method shows the drawbacks of all concrete confinements even if the hollow boxes are lined with rubber or plastics sheets; this measure means an additional, expensive step, and there is no security of a permanent tightness of this liner.

The use of phenolics for the confinement of wastes has not yet become known so far.

SUMMARY OF THE INVENTION

The first and major object of the present invention is to provide a new and useful process for the confinement of solid materials which may be in powder or compact form, especially of ultimate wastes such as ashes coming from waste or garbage incineration installations.

A second and also important object of the present invention is a process of the depicted kind which is capable of replacing, totally or in part, the confinement methods which use concrete preparations.

Finally, another important object of the invention is to provide a confinement process which does not imply the drawbacks of the presently known confinement methods which are carried out in using appreciable amounts of water which must later on be removed by drying and leaves behind pores and other interstices in the confinement.

These objects and still others are attained by the process of this invention which is carried out in first preparing a mixture containing at least (1) a liquid phenolic resin, (2) a crosslinking agent for said resin, and (3) the solid materials to be stored in the confinement. This mixture is then crosslinked or allowed to crosslink, and a three-dimensional matrix of a phenoplast is obtained permanently captivating the said solid materials to be contained.

As a liquid phenolic resin cited above, the use of a resol prepared from phenol and formaldehyde is preferred that is only slightly condensed and thus capable of being spontaneously crosslinked when the crosslinking agent is added. The invention contemplates preferably as a crosslinking agent (2) mentioned above, linear phenolic oligomers that are wholly or partially sulfonated, cyclic phenolic oligomers that are wholly or partially sulfonated, and mixtures of these oligomers. Sulfonated cyclic phenolic oligomers to be preferably used are the so-called calixarenes which are wholly or partly sulfonated.

The crosslinking may be carried out after having transferred the mixture defined above into a mould. This avoids any flowing away of the mixture and the necessity to use relatively viscous resins and crosslinking agents. Furthermore, crosslinking may be accelerated by more or less gently heating, and this heating is of course easier when the composition has been cast into a mould. However, the present process is preferably carried out at normal temperature and at atmospheric pressure.

DETAILED DESCRIPTION

The following description gives general information on the nature and the realization of the present process. This description will be followed by concrete Examples which further explain the invention but which are not to be considered as to limit the invention in any way.

In carrying out the invention, one starts from a phenolic resin of the resol type which is only a low condensed one and in which the solids to be confined in granulate or powder form are introduced. The necessary conditions for obtaining such a low condensed, liquid resin are known to those skilled in the art; it is generally sufficient to select an appropriate ratio between the starting materials, namely phenol and formaldehyde, and not to exceed during the condensation reaction in a basic medium a given temperature, for example from 40 to 60° C. When such a low condensed phenolic resin is reacted with a liquid acidic crosslinking agent, a three-dimensional network is formed by polycondensation. The invention provides the addition of the solid materials to be confined either to the low condensed starting phenolic resin or to the crosslinking agent, or to both. The particular possibility to be selected will depend on the nature of the solid materials to be confined.

The fact that the starting resin and the crosslinking agent are liquid compositions will ascertain, due to their relatively low viscosity, a good impregnation of the solid materials to be confined, be they in powder form or not.

According to the invention, the liquid crosslinking agent which has an acidic character, due to its sulfonic acid moieties, is preferably selected from partially or wholly sulfonated phenolic oligomers. These substances are generally of the same nature as the resols, their substituents —$SO_3H$ excepted, and they are chemically combined with the resols in forming bridges between the resol molecules. They are thus not merely physically imprisoned in the phenoplast under formation as are the acid catalysts used until now for the polycondensation of the resols but they are, to the contrary, fixedly incorporated into said network as a chemical constituent thereof.

The invention uses the new crosslinking agent in the form of partially or wholly sulfonated linear phenolic oligomers, of partially or wholly sulfonated cyclic phenolic oligomers, or of their mixtures, and each particular mixture may further contain sulfonated phenol.

The sulfonated cyclic phenolic oligomers are in part already known; they have however never been proposed as additives for resols in the polycondensation thereof. Sulfonated cyclic phenolic oligomers are for example described in the paper "Synthesis and acid-base properties of calix[4], calix[6] and calix[8]arenes p-sulfonic acids" by J. P. Scharff, M. Mahjoubi and R. Perrin, *New J. Chem.,* 1991, 15, 883–887; however, their use according to the present invention, namely as a crosslinking agent, has not been disclosed nor suggested.

The addition of the above described crosslinking agent system to the resols ascertains first the crosslinking and the hardening of the whole mass. It has been found that, during the described step, the crosslinking agents used according to the present invention display a three-fold function: on one hand, they act as initiators in the polycondensation reaction; on the other hand, they allow the formation of a three-dimensional matrix in which the solid materials to be confined are immobilized in an absolutely stable fashion; and finally, they have the property to fix, by their acidic groups, basic solid materials to be confined. Furthermore, some of these crosslinking agents are capable of forming inclusion complexes ("chlathrates") with certain ions, due to their structure that contains polar macrocyclic cavities.

For example, depending on their size, their conformation and their functionality, the calixarenes are capable of retaining certain ions: metallic cations such as $Li^+$, $Na^+$, $K^+$, $Rb^+$, $Ag^+$, $Cs^+$, $Ca^{2+}$, $Be^{2+}$, $Mg^{2+}$, $Ni^{2+}$, $Zn^{2+}$, $Cu^{2+}$, $Cd^{2+}$, $Pb^{2+}$; the lanthanides (La, Eu, Pr, Tm, Lu), and the actinides ($UO_2^{2+}$, $Th^{4+}$); organic cations (ammonium), and some anions such as $Cl^-$, $Br^-$, $I^-$, $HSO_4^-$, $H_2PO_4^-$. Most of these ions are present in ionic form or are combined in the solid materials to be confined. If calixarenes are present within the matrix of the heat curing resol matrix, which is the preferred condition, they bring about a capability of a selective molecular inclusion of most of the ions in the solid mixtures to be confined.

The calixarenes form endo and exo complexes, the latter due to substituents which can be introduced in their molecule before they are added to the resol as the crosslinking agent. The one skilled in the art has the necessary knowledge for selecting these substituents in function of the molecules to be complexed by endo complexes. The formation of the endo complexes and the inclusions mentioned above are possible thanks to the hollow cone shape of the cyclic basic structure of the calixarenes. For example, the cone formed by calix[5]arenes has a big opening of 0.53 nm in diameter and a little opening or 0.24 nm in diameter; as a reference, the ionic diameter of $Li^+$ is 0.152 nm, of $Na^+$ is 0.204 nm, and of $Cs^+$, 0.34 nm. In blocking the ions within the cavities of the calixarenes, the present process eliminates the mobility possibilities of the ions within the heat set matrix and makes thus impossible any contamination of lixiviates. In fact, the molecules of the solid materials to be confined are retained, on one hand, by imprisonment within the phenoplast matrix and, on the other hand, they are entrapped and complexed in the particular "cage" structure of each calixarene molecule which is polycondensed in the matrix.

The preferentially used crosslinking agent in the present process will be selected depending on the particular solid materials to be confined, namely from partly or wholly sulfonated cyclic phenolic oligomers ("calixarenes") to which at least one partly or wholly sulfonated linear species may be added, and their mixtures. These mixtures may also contain sulfonated monomeric phenol. However, the crosslinking agent used in the present process may also comprise partly or wholly sulfonated linear phenolic oligomers if the solid materials to be confined have a composition which is not much sensitive to lixiviation, or not at all.

In the practice of the present invention, the solid materials to be confined may be added, depending on the particular case, to the low condensed starting phenolic resin, and the crosslinking agent is added to this mixture. In an alternative manner, the solid materials to be confined are mixed with the crosslinking agent, and the said phenolic resin is then introduced. It is also possible to blend a portion of the solid materials to be confined with the phenolic resin and the remainder of these materials with the crosslinking agent, and then to combine these two mixtures. Finally, it is possible to blend simultaneously all components listed above, namely the solids to be confined, the resin and the crosslinking agent, preferably in a mould since the blend hardens very rapidly.

The mixing techniques described above may be conducted batchwise or continuously. The one skilled in the art will be capable of designing adequate devices and installations which are therefore not described herein.

Regarding the batchwise process variant, the final mixture comprising all components is generally made or introduced in a mold having the shape of the body or block desired. The crosslinking reaction does generally not require any heating of the mixture or the addition of an starter, initiator or promoter for being started, and after some minutes, a solid block is obtained which is not sensible to lixiviation, resists water even if it contains acids such as carbonic acid, sulfurous acid, sulfuric acid, nitrogen containing acids, and resists heat, typically up to about 200° C. or even higher.

The solid matrix which is constituted by the crosslinked phenolic resin presents an improved property of imprisoning the solid materials to be confined. This fact resides partly in the entrapping properties of the crosslinked three-dimensional network and in molecular receptors dispersed within the matrix. The contamination of any lixiviation liquors emerging from the confinement blocks obtained in the process of this invention, is virtually absent. Furthermore, the manufactured blocks may contain, for example, 60% by weight and even more of solids such as ashes coming from garbage incineration plants, and for example 80% or more in the case of the confinement of slag. The process of this invention is therefore particularly economic, because the phenol used as the first starting material is an inexpensive material.

It will also be possible to add to the system comprising the resol, the crosslinking agent, and the solid materials to be confined, a dyestuff which may serve for the marking of the nature of the solid materials after the hardening of the system.

The following is a non-exhaustive list of solid materials which can be confined by the present process:

Incineration ashes
smoke residues
flow ashes
industrial wastes
nuclear residues
toxic residues (medicines, pesticides, etc.)
contaminated earth
dried sludges from water treatments
slag and ashes from coal, etc.

The following Examples explain the present invention further without limiting it in any way.

In the Examples, residues are treated coming from smokes of the installation for the incineration of garbage situated in Cheneviers, Geneva, Switzerland. These residues are named RPSHGI ("Residues of the Purification of Smoke from Household Garbage Incineration"). Furthermore, other materials were used such as silica, foundry sands, coal slag, coal fines, etc. The pH value of these substances, measured in aqueous solution or dispersion, varies between 5 and 12.

The ratio between the solid materials and the resin and crosslinking agent may vary depending on the nature of the solid materials and the desired or necessary degree of confinement.

EXAMPLE 1

In this Example, the confinement of a RPSHGI will be described. The RPSHGI is a grayish powdery mass containing, according to an analysis by X-ray diffraction, the following substances: $CaCO_3$, NaCl, KCl, $SiO_2$, $CaSO_4$ and metals such as Pb, Mo, Bi, Zn, Cd, Al. As a first step, a sample is pre-treated by sulfuric acid in the following manner: 20 ml of concentrated $H_2SO_4$ are diluted with 180 ml of water, 30 g of RPSHGI are introduced into the acid solution, and the mixture is stirred during 30 minutes. The mixture is then filtered, and the solid filtration cake is washed twice with 200 ml of water each. The RPSHGI thus treated is recovered by filtration and then dried in an oven at 80 to 100° C.

To this pre-treated and dried sample which weighs 12.5 g, 4.675 g of a liquid crosslinking system are added that contains sulfonated phenolic oligomers, prepared in the following way:

10 ml of 95% sulfuric acid are slowly introduced into 220 g of phenol, containing about 10% of water, under stirring at a temperature of about 40° C. Then, 45 ml of aqueous formalin of 37% are slowly introduced with continued stirring under control of the temperature which must not exceed 40° C. Then, stirring is continued for another hour. The oligomer solution thus obtained is decanted, and the phenolic phase is separated from the aqueous one. The aqueous phase is brought to dryness, leaving a liquid preparation of phenolics. 70 ml of 95% sulfuric acid are then introduced slowly and in taking care that the temperature does not rise over 50° C., into 245 ml of the liquid oligomers obtained in the previous step. After the end of introduction, stirring is continued for 16 hours. The sulfonated phenolic oligomers are obtained in the form of a concentrated aqueous solution.

The mixture of the RPSHGI and the sulfonated phenolic oligomers is prepared at ambient temperature under mechanical stirring. The mixture is then transferred at ambient temperature into an open mould, 14.06 g of liquid phenolic resin are added, thus a low condensed resol, obtained in the following manner:

862.5 g of phenol that contains small amounts of water are mixed with 20.5 g of an aqueous NaOH solution. 367 g of paraformaldehyde are portionwise introduced into this mixture during one hour. The temperature of the reaction mixture is controlled to a value between 40 and 50° C. After the introduction is completed, stirring is continued for at least 10 hours at the indicated temperature. The resol thus obtained is then transferred into an appropriate recipient where it is cooled down to room temperature.

When this resol is added as described above, a very rapid exothermic reaction is observed which yields after a few seconds a solid block having a density of 670 g/dm$^3$.

EXAMPLE 2

50 g of silica, namely a sand of Fontainebleau, and 5.3 g of the crosslinking agent of Example 1 are blended. 16 g of the resol of Example 1 are added to the blend. The very rapid exothermic crosslinking reaction yields, after unmoulding, a solid block having a density of 1,500 g/dm$^3$.

EXAMPLE 3

To 50 g of untreated foundry sand, 5.3 g of the liquid crosslinking agent according to Example 1 are added and mechanically blended. 16 g of liquid resol are mixed into this blend. The crosslinking in an open mould yields a solid block having a density of 1,270 g/dm$^3$.

EXAMPLE 4

To 25 g of mortar crushed coal slag, 0.25 g of liquid crosslinking agent are added, and mixing is effected by mechanical means. At room temperature (20 to 25° C.), 18.75 g of liquid resol are added under stirring. The reticulation of the system yields after unmoulding a solid block having a density of 750 g/dm$^3$.

EXAMPLE 5

25 g of coal fines are treated under mechanical stirring with a 1N to 1.8N sulfuric acid solution. The solids are recovered by filtration and washed twice with 180 ml of water each. The pre-treated coal fines are recovered by filtration and then dried at ambient temperature.

To 25 g of thus pre-treated coal fines, 6.25 g of liquid crosslinking agent are added. 18.75 g of liquid resol are then added to the mixture. The spontaneous crosslinking yields a solid block having a density of 1,070 g/dm$^3$.

EXAMPLE 6

12.5 g of pre-treated RPSHGI, see Example 1, are simultaneously blended, under vigorous stirring or by extrusion, with 4.675 g of the crosslinking agent and 14.1 g of the phenolic resin described in Example 1. The mixing is made in an appropriate mould, and if an extruder is used, the issuing blend is directly extruded into the mould.

A very rapid exothermic reaction is observed which yields after a few seconds a solid block having a density of about 670 g/dm$^3$.

Lixiviation tests which have been conducted in using pure water, acidic water and basic water at different temperatures and time durations, have shown that the concentration of lixiviated heavy metal ions is by several orders of magnitude lower than the lowest legal standard concentrations as issued in industrialized countries.

The fact that even highly toxic substances can now be transformed into solid bodies which can no longer be attacked by atmospheric influences, opens a field for the valorization of these bodies. Known bodies of confined wastes had to be stored until now in safe grounds and could by no means be used in any way. However, the solid bodies obtained by the process of the present invention can now be used further, for example, when appropriately shaped, as construction bricks, under-road pavement granulate, railway beds, crossties, girders, etc. The resistance of the solid shaped bodies of this invention against lixiviation and other atmospheric attacks remains ascertained even if the bodies will break or are comminuted since these resistance properties are homogeneously identical throughout the whole bodies.

To complete the present disclosure, it should be added that the phenolic resin or resol, the crosslinking agent and the solid material to be confined may be constituted by one, two or more species selected from the respective groups.

Furthermore, it may be desired for special applications to cover the shaped bodies that are obtained by the process of this invention, by a more or less thick layer of a mortar, concrete or another hydraulic binder, or to disperse these bodies, in particular when they are in granular or other particulate form, in a mass of such a binder, and to allow the binder to harden. For example, this may be desirable when the shaped bodies of this invention should further be used as construction elements, in order to further improve the binding strength to concrete or other binders. The process for executing this embodiment need not be described in detail since the ones skilled in the art will be aware how to proceed without special information.

What is claimed is:

1. A process for the confinement of solid materials in powder or compact form wherein said materials are imprisoned within a solid matrix, comprising the following steps:

(A) preparing a mixture containing at least (1) a liquid phenolic resin, (2) a crosslinking agent for said resin (1) selected from partially or totally sulfonated linear phenolic oligomers, partially or totally sulfonated cyclic phenolic oligomers, and their mixtures, and (3) said solid materials, and (B) allowing or making the mixture (A) to crosslink and to form a three-dimensional matrix of a phenoplast wherein said solid materials to be confined are imprisoned.

2. The process of claim 1, wherein said liquid phenolic resin (1) is a resol prepared from phenol and formaldehyde, this resol being of low degree of condensation and capable of being spontaneously condensed on the addition of said crosslinking agent (2).

3. The process of claim 1, wherein said crosslinking agent (2) is a partly or totally sulfonated cyclic phenolic oligomer, namely at least one partly or totally sulfonated calixarene.

4. The process of claim 3, wherein said crosslinking agent (2) further contains at least one partly or totally sulfonated linear phenolic oligomer.

5. The process of claim 1, wherein said solid materials to be confined (3) are blended with the said liquid phenolic resin (1), said crosslinking agent (2) is added, an intimate mixture is prepared, and the resulting system is allowed to harden in an appropriate mold to yield a solid shaped body.

6. The process of claim 5, further comprising covering said hardened shaped body which has been obtained, with a layer of mortar, concrete or another hydraulic binder, and hardening said layer.

7. The process of claim 1, wherein said solid materials to be confined (3) are blended with said crosslinking agent (2), said liquid phenolic resin (1) is added, an intimate mixture is prepared, and the resulting system is allowed to harden in an appropriate mold to yield a solid shaped body.

8. The process of claim 7, further comprising covering said hardened shaped body which has been obtained, with a layer of mortar, concrete or another hydraulic binder, and hardening said layer.

9. The process of claim 1, wherein a first portion of said solid materials to be confined (3) is blended with said liquid phenolic resin (1) and a second portion of said solid materials to be confined (3) is blended with the crosslinking agent (2), the two partial mixtures are combined, and the resulting system is allowed to harden in an appropriate mold to yield a solid shaped body.

10. The process of claim 9, further comprising covering said hardened shaped body which has been obtained, with a layer of mortar, concrete or another hydraulic binder, and hardening said layer.

11. The process of claim 1, wherein said solid materials to be confined (3), the said crosslinking agent (2) and the said liquid phenolic resin (1) are simultaneously blended in an appropriate mold to form an intimate mixture, and the resulting system is allowed to harden to yield a solid shaped body.

12. The process of claim 11, further comprising covering said hardened shaped body which has been obtained, with a layer of mortar, concrete or another hydraulic binder, and hardening said layer.

13. The process of claim 1, further comprising adding a dyestuff to the said liquid phenolic resin (1) or to the said crosslinking agent (2) or to both.

14. The process of claim 1, further comprising carrying out the process at ambient temperature and pressure.

15. The process of claim 1, wherein said solid materials to be confined (3) are garbage or waste incineration ashes.

16. A shaped body comprising at least one solid waste material in powder or compact form contained within a solid confining material, wherein said waste material is imprisoned within a solid matrix formed by crosslinking a mixture containing at least one phenolic resin and at least one crosslinking agent for said resin, said crosslinking agent being selected from partially or totally sulfonated linear phenolic oligomers, partially or totally sulfonated cyclic phenolic oligomers, and their mixtures, said mixture further containing said solid waste material or materials to be confined.

17. The shaped body of claim 16, wherein said waste material is highly toxic.

18. The shaped body of claim 16, wherein said waste material is garbage or waste incineration ash.

19. The shaped body of claim 16, further covered by a layer of a hardened hydraulic binder material.

* * * * *